March 2, 1965     S. OHANIAN     3,171,914
ACCELERATOR OPERATED SPEED CHANGE WARNING SWITCH
Filed May 1, 1962
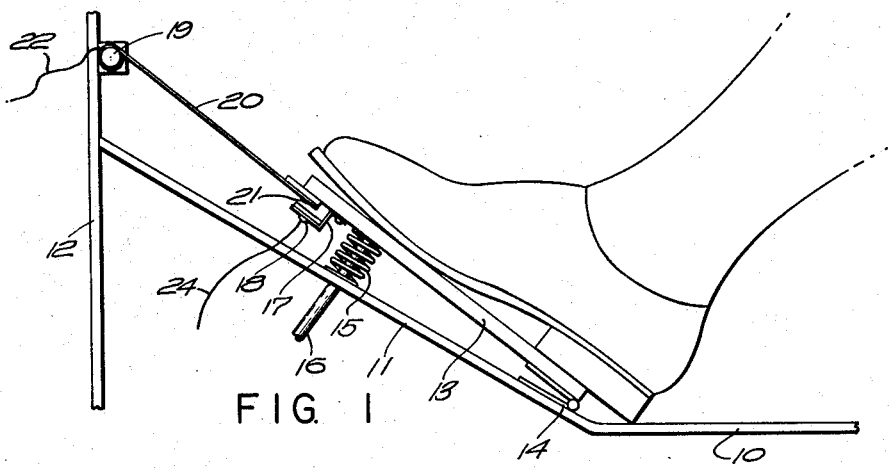
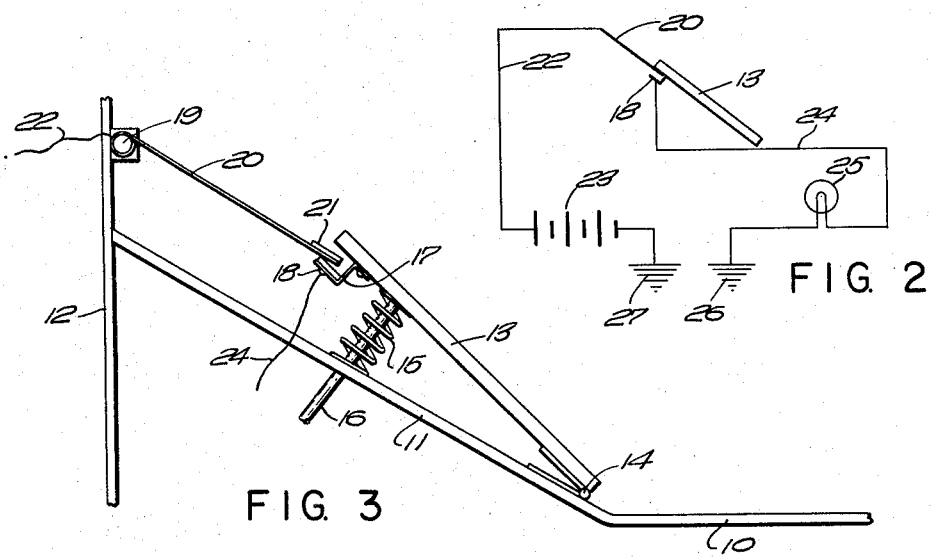
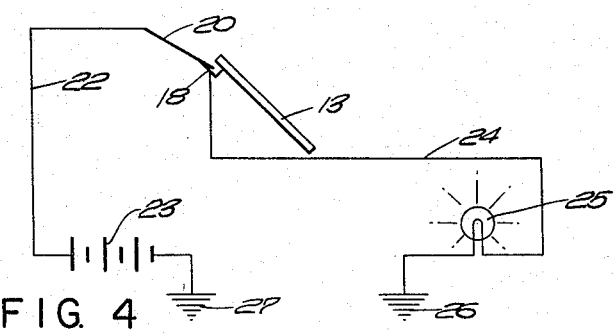
INVENTOR.
STEPHEN OHANIAN
BY
ATTORNEY

United States Patent Office 3,171,914
Patented Mar. 2, 1965

3,171,914
ACCELERATOR OPERATED SPEED CHANGE WARNING SWITCH
Stephen Ohanian, 34 Glenbrook Road, Warwick, R.I.
Filed May 1, 1962, Ser. No. 191,554
2 Claims. (Cl. 200—61.89)

My present invention relates to signal devices and more particularly to a signal device for an automotive vehicle.

The principal object of the present invention is to provide a signal device for an automotive vehicle which indicates to the motorist following the vehicle whether the vehicle is slowing or stopping.

Another object of the present invention is to provide a signal device to indicate when the automotive vehicle is slowing or stopping which is independent of the braking system.

Another object of the present invention is to provide a signal device which can be used with separate signalling lamps or with the existing lights now installed on motor vehicles.

A further object of the present invention is to provide a simple signalling device for indicating to the following motorist when the automotive vehicle is being slowed or stopped, which can readily be installed on existing motor vehicle and which is simple in construction and easy and economical to manufacture and assemble.

With the above and other objects and advantageous features in view my invention consists of a novel arrangement of parts more fully disclosed in the detailed description following in conjunction with the accompanying drawings and more particularly defined in the appended claims.

In the drawings,

FIG. 1 is a side elevation of a motor vehicle accelerator with the switch of the present invention installed therein.

FIG. 2 is a diagrammatic view of the electrical arrangement for the conditions illustrated in FIG. 1.

FIG. 3 is a view similar to FIG. 1 showing the switch in "on" position.

FIG. 4 is an electrical diagram similar to the one in FIG. 2 for the condition shown in FIG. 3.

Many types of signal devices have been designed for indicating the condition of the vehicle to a car following behind it. However, these devices are usually complicated in construction and operation and embody complicated and a multitude of electrical circuits difficult and expensive to attach to an automobile. Furthermore, most of these devices require additional lights some a multiplicity of lights in varying colors. The present invention provides an extremely simple switch arrangement which can be tied into the present taillight of a motor vehicle or if desired an additional red or amber light may be provided. Applicant has found that the various auxiliary lights heretofore attached to accelerators are designed to operate when the motorist removes his foot from the accelerator pedal. However, there is a need for a signal to a following motor vehicle on an express highway. For example, if a car is travelling at sixty or sixty five miles per hour and the motorist decelerates by lifting his foot on the accelerator pedal to reduce his speed to fifty five miles an hour then the car following should be warned of this change especially at these high speeds. With the device of the present invention it is not necessary that the motorist remove his foot completely from the accelerator pedal. The present invention is designed to provide a signal for the following motorist whenever the operator eases his foot on the accelerator pedal to slow the vehicle. When the pedal is being depressed for steady speeds or acceleration, the light will not operate.

This signal can be superimposed on the brake light so that the red light which signals a stopping action will actually go on as soon as the operator starts to ease up on the accelerator pedal and even before he reaches the brake pedal. This split second warning may be sufficient to avert a rear end collision.

Referring more in detail to the drawings illustrating my invention, FIGS. 1 and 2 illustrate the general assembly of the device of the present invention. In the conventional motor vehicle the floor board 10 is normally raised to extend upwardly at 11 towards the dashboard or front wall 12. Conventionally, the accelerator comprises an elongated foot pedal 13 hinged at the rear portion 14 to the floor board 11. The front part of the foot pedal rests on a coil spring 15 which tends to retain the foot pedal 13 in raised position for idling the motor. When the foot pedal is moved downwardly the front end is attached to a rod 16, which extends through the spring 15, and operates the carburetor for increasing the speed of the car. The foot pedal 13 is usually made of metal but it is also conventionally covered with rubber or plastic which is dielectric. In accordance with the present invention the forward end of the foot pedal 13 is provided with a bracket 17 attached to the underside of the foot pedal 13. The bracket 17 provides a short straight contact portion 18 which is in spaced parallel relation to the end of the foot pedal 13. In accordance with the present invention I provide a friction pivot member 19 which is bolted or otherwise attached to the dashboard 12 and has pivotally extending therefrom a switch arm 20. The pivot point 19 retains the switch arm 20 in frictionally so that it can be moved with pressure but will remain in any position because of the frictional grab at the pivot point 19. The arm 20 extends towards the foot pedal 13 with the forward end of the arm 21 passing beneath the foot pedal and into the space between the portion 18 of the bracket and the bottom of the foot pedal. This spacing is preferably much greater than the thickness of the arm 20. It is contemplated that the bracket 17 and especially the portion 18 be dielectrically separated from the foot pedal 13. Now referring to FIG. 2, the arm 20 is provided with a cord lead connection 22 which extends to the automobile battery 23. The bracket 17 and especially its portion 18 is connected by a cord lead connection 24 to the signal light 25. This signal light 25 may be either the standard red taillight and particularly the filament thereof used to indicate the brake, or a separate filament for indicating the acceleration, or a separate light perhaps of another color. In any event the wire from the signal light 25 is attached to a ground connection 26. As is usual in an automobile, the other side of the battery is also grounded to the body at 27 to complete the circuit. Now referring to FIG. 1, when the operator of the vehicle depresses the accelerator pedal 13 the switch arm 20 and more especially its forward end 21 will be touched or contacted by the forward underside of the foot pedal 13. Since this pedal 13 is not attached electrically to the circuit shown in FIG. 2 it is actually a dielectric rubber covering, no signal is made. Furthermore, if the person stops depressing the foot pedal and merely maintains his speed, there is no closing of any circuit and no signal is given.

Now referring to FIGS. 3 and 4, if the operator eases upwardly on the foot pedal even if it is just to reduce the speed slightly from the particular cruising speed, the portion 18 of the bracket 17 will immediately contact the end 21 of the arm 20 which is in its path and close the electrical circuit as shown in FIG. 4. Closing the circuit immediately actuates the signal light 25. Since the arm 20 will remain frictionally wherever it is pushed, as soon as the operator again starts to depress the pedal the arm 20 will remain put and the pedal will push the bracket portion 18 away from its contact so that when the vehicle has been decelerated to the point desired by the operator and the operator again moves his foot slightly downwardly on the accelerator, the signal light will immediately go out. Thus the signal will be made at whatever speed the vehicle is travelling and at whatever point the accelerator is depressed. Even if the vehicle has been travelling at extremely high speeds and the operator merely wishes to reduce his speed by ten or fifteen miles an hour a signal will be flashed to the following car to this effect. This will enable the following car to adjust his speed to that of the vehicle in front of him when it is decelerating and not just when it is coming to a stop.

The device of the present invention is thus extremely simple in construction and does not require complicated and expensive circuits. It can easily be attached to existing automotive constructions and can easily be understood by the motorist following the vehicle. It does not require complicated lighting systems with a multiplicity of lights and does not require complicated circuits with a multiplicity of circuits for each light. Other advantages of the present invention will be readily apparent to a person skilled in the art.

I claim:

1. A switch for signal light for a motor vehicle having a front wall and an accelerator pedal hinged at one end, comprising an electrically conductive member mounted on the underside of and spaced from the end of said pedal, and a switch arm pivotally mounted on the front wall and extending between said pedal and said member, said pivotal mounting of said switch arm frictionally retaining said switch arm against movement except by direct force of said pedal and said member.

2. A switch for a signal light for a motor vehicle having a front wall and an accelerator pedal hinged at one end, comprising an electrically conductive member mounted beneath and spaced from the free end of said pedal, and a switch arm pivotally mounted on the front wall and extending between said pedal and said member, electrical contact between said arm and said member being made when said pedal is moved upwardly and being broken when said pedal is moved downwardly, in any position of said pedal, said pivotal mounting of said switch arm frictionally retaining said switch arm against movement except by direct force of said pedal and said member.

References Cited by the Examiner

UNITED STATES PATENTS

| 2,678,978 | 5/54 | Reynolds | 200—61.88 |
| 2,685,005 | 7/54 | Anderson | 200—61.89 |
| 2,691,744 | 10/54 | Peters | 315—80 |
| 2,824,921 | 2/58 | Baumheckel | 200—86.5 |
| 2,832,863 | 4/58 | Quimby | 200—86.5 |

BERNARD A. GILHEANY, *Primary Examiner.*

ROBERT H. ROSE, ROBERT K. SCHAEFER,
*Examiners.*